(12) United States Patent
Meyer et al.

(10) Patent No.: US 8,841,575 B2
(45) Date of Patent: Sep. 23, 2014

(54) LASER MATCH HONING SYSTEM AND METHOD

(75) Inventors: Frank Meyer, Wuxi (CN); Jannis Stemmann, Wuxi (CN); Harald-Thomas Stumpp, Stuttgart-Bergheim (DE); Fernanda Rojas, Darmstadt (DE)

(73) Assignee: Robert Bosch GmbH, Stuttgart (DE)

( * ) Notice: Subject to any disclaimer, the term of this patent is extended or adjusted under 35 U.S.C. 154(b) by 400 days.

(21) Appl. No.: 13/496,295

(22) PCT Filed: Sep. 15, 2010

(86) PCT No.: PCT/CN2010/076940
§ 371 (c)(1),
(2), (4) Date: Jul. 20, 2012

(87) PCT Pub. No.: WO2011/032495
PCT Pub. Date: Mar. 24, 2011

(65) Prior Publication Data
US 2012/0273471 A1   Nov. 1, 2012

(30) Foreign Application Priority Data
Sep. 15, 2009   (CN) .......................... 2009 1 0173534

(51) Int. Cl.
*B23K 26/03* (2006.01)
*B23K 26/36* (2014.01)
*B24B 15/08* (2006.01)
*B24B 49/12* (2006.01)
*B23K 26/04* (2014.01)
*B23K 26/08* (2014.01)

(52) U.S. Cl.
CPC .............. *B23K 26/03* (2013.01); *B23K 26/032* (2013.01); *B23K 26/048* (2013.01); *B23K 26/0823* (2013.01); *B23K 26/36* (2013.01); *B23K 2201/04* (2013.01); *B24B 15/08* (2013.01); *B24B 49/12* (2013.01)

USPC ............ 219/121.62; 219/121.68; 219/121.69; 700/166; 700/195

(58) Field of Classification Search
CPC ...... B23K 26/03; B23K 26/032; B23K 26/36; B24B 15/08; B24B 49/12
USPC ........... 219/121.62, 121.68, 121.69; 700/166, 700/195; 29/890.1, 464; 239/533.1–533.15, 239/584–586
See application file for complete search history.

(56) References Cited

U.S. PATENT DOCUMENTS 5,072,092 A   12/1991  Richter et al.
6,138,055 A * 10/2000  Pryor ............................. 700/163
(Continued)

FOREIGN PATENT DOCUMENTS

CN           1843680       10/2006
JP           61058951       3/1986
(Continued)

OTHER PUBLICATIONS

PCT/CN2010/076940 International Search Report.

*Primary Examiner* — Samuel M Heinrich
(74) *Attorney, Agent, or Firm* — Michael Best & Friedrich LLP

(57) ABSTRACT

A laser match honing system and method are provided for processing one of a pair of mechanically matching components (1, 2) having matching portions (12, 22, 16, 26) that will be fitted with each other. A dimension of the matching portion (12, 16) of the first component (1) is measured and is then used for calculating the desired dimension of the corresponding matching portion (22, 26) of the second component (2). An actual dimension of the matching portion (22, 26) of the second component (2) is also measured. Then, the matching portion (22, 26) of the second component (2) is honed by laser beam in the condition that the actual dimension is not equal to the desired dimension.

20 Claims, 2 Drawing Sheets

(56) References Cited

U.S. PATENT DOCUMENTS 7,323,657 B2 * 1/2008 Cheng .................. 219/121.69
2008/0000887 A1 1/2008 Sheth et al.

FOREIGN PATENT DOCUMENTS

| JP | 2002113641 | 4/2002 |
|----|------------|--------|
| JP | 2002233196 | 8/2002 |

* cited by examiner

LASER MATCH HONING SYSTEM AND METHOD

TECHNICAL FIELD

The present invention relates to a laser match honing system and a method for processing one component of a pair of mechanically matching components, such as an injector needle which is to be fitted in an injector body of a fuel injector.

BACKGROUND OF THE INVENTION

Mechanically matching components, which are fitted together in pairs, are well known in various fields. For example, in an injector such as a fuel injector, an injector needle and an injector body form a matching pair; in a piston pump, a piston and a cylinder form a matching pair; etc. The two components of a matching pair have matching portions which are to be fitted together with a certain fit tolerance or a gap between them. The accuracy of the fit tolerance should be controlled precisely for the correct function of the matching pair. It is known that in most cases the two components of a matching pair are machined individually and have particular dimensional tolerances at their matching portions. It is difficult to ensure a correct fit tolerance or a correct gap to be obtained from the combination of the dimensional tolerances of the matching portions.

For example, when manufacturing fuel injectors, nozzle bodies and nozzle needles, after grinding, are graded based on the dimensional precision of their matching portions, so that the nozzle bodies and the nozzle needles, which meet the fit tolerance requirement, are fitted together. For example, for nozzle bodies with the inner diameter of their matching portions having dimensional tolerances falling into a certain range, only the nozzle needles with the outer diameter of their corresponding matching portions having dimensional tolerances falling into a corresponding range can be used. That is to say, other nozzle needles with the outer diameter of their corresponding matching portions having dimensional tolerances falling out of the corresponding range cannot be used, and thus should be stored as inventory to be used with other nozzle bodies which are suitable for them. It can be seen that, for manufacturing fuel injectors as well as other devices with mechanically matching components in this way, a grading step has to be carried out. In addition, for achieving correct fitting with high probability, each type of nozzle needles should have 12 to 18 grades. This significantly increases the material cost, the manufacturing cost and the inventory cost, especially for coated needles for common rail injection systems. Even so, it still cannot ensure each time a successful fitting.

It is known that in common rail injector manufacturing field, a match grinding process is adopted which may alleviate the above problems. In a match grinding process, a valve body is manufactured first. The inner diameter of the matching portion of the valve body has a certain dimensional tolerance after grinding. Then, the inner diameter is pneumatically measured. Based on the measurement, the outer diameter of a matching valve needle is adaptively ground. In this way, the valve needle is suitable for the valve body, and no redundant valve needles will be created. However, in an injector assembled in this way, the fit clearance or guide clearance between the valve body and the valve needle may have a manufacturing tolerance larger than that required by the injector nozzle.

In recent years, ultrashort pulse lasers of femtosecond level have been used for laser ablation. As an example, Titansaphirlaser is used in cold material ablation, in which the removed material is transformed directly from solid state into gas state. No heat affected zone is found in the material near the ablation area. Lasers for this purpose are commercially available.

It is known that laser honing has been used for forming a running surface of a cylinder of an internal combustion engine.

It is also known to use ultrashort pulse lasers for manufacturing for example HDEVs, such as perforated injection disks. However, those lasers are psec-lasers, which cannot perform cold ablation. An object of the present invention is to overcome the above shortages existed in the prior art by providing an system and method which can manufacture mechanically matching components, such as injector bodies and injector needles of fuel injectors, in a more efficient way and with a lower inventory.

SUMMARY OF THE INVENTION

To achieve the above object, the present invention in one aspect provides a laser match honing system for processing one of a pair of mechanically matching components, the pair comprising a first component which has a finished matching portion and a second component which has a corresponding matching portion to be processed, the system comprising:

a system controller for controlling the operation of the system, a measuring gauge coupled to the system controller and adapted to measure a dimension of the matching portion of the first component and send the measurement to the system controller, a supporting device adapted to carry the second component, a laser beam source coupled between a processing optic unit and the system controller and adapted to emit a laser beam to the processing optic unit when receiving a command from the system controller, an optical measuring instrument coupled between the processing optic unit and the system controller and adapted to emit a measuring light to the processing optic unit for measuring the current distance between the processing optic unit and the matching portion of the second component, and the processing optic unit being adapted to direct the laser beam and the measuring light onto the matching portion of the second component, wherein the system controller calculates a desired dimension and a real dimension of the matching portion of the second component based on the measurement from the measuring gauge and that from the optical measuring instrument respectively, and then the system controller, in the condition that the real dimension is not equal to the desired dimension, operates the laser beam source to transmit the laser beam for honing the matching portion of the second component by the laser beam.

In accordance with a preferred embodiment of the invention, the first component is an injector body of a fuel injector, and the second component is an injector needle of the fuel injector.

In accordance with another preferred embodiment of the invention, the matching portions comprise a guiding hole of the injector body and a corresponding guided portion of the injector needle, and/or a passage hole of the injector body and a corresponding stem portion of the injector needle, and/or a needle seat of the injector body and a corresponding seating portion of the injector needle.

In accordance with another preferred embodiment of the invention, the matching portions comprise a guiding hole of the injector body and a corresponding guided portion of the injector needle, the dimension of the matching portion of the first component to be measured by the measuring gauge is the inner diameter of the guiding hole of the injector body, and the desired dimension and the real dimension of the matching portion of the second component are the desired outer diameter and the real outer diameter of the guided portion of the injector needle respectively.

In accordance with another preferred embodiment of the invention, the second component is rotatably carried by the supporting device.

In accordance with another preferred embodiment of the invention, the processing optic unit is movable so that the laser beam and the measuring light move in a direction parallel to a central axis of the second component.

In accordance with another preferred embodiment of the invention, the processing optic unit is moved by a linear direct drive free of clearance.

In accordance with another preferred embodiment of the invention, the processing optic unit is a scanner.

In accordance with another preferred embodiment of the invention, the scanner is selected from a group of a uni-axial scanner, a bi-axial scanner, and a tri-axial scanner. In accordance with another preferred embodiment of the invention, the laser is an ultrashort pulse laser.

In accordance with another preferred embodiment of the invention, the ultrashort pulse laser is a femtosecond laser.

In accordance with another preferred embodiment of the invention, the laser beam and the measuring light are coaxial between the processing optic unit and the matching portion of the second component.

In accordance with another preferred embodiment of the invention, the laser match honing system further comprises a lateral suction device near the matching portion of the second component.

The present invention in another aspect provides a laser match honing method for processing one of a pair of mechanically matching components, the pair comprising a first component which has a finished matching portion and a second component which has a corresponding matching portion to be processed, the method comprises the following steps:

measuring a dimension of the matching portion of the first component, measuring the current distance between a processing optic unit and the matching portion of the second component, calculating a desired dimension and a real dimension of the matching portion of the second component based on the measured dimension and the measured distance respectively, and honing the matching portion of the second component by laser beam in the condition that the real dimension is not equal to the desired dimension.

In accordance with a preferred embodiment of the invention, the first component is an injector body of a fuel injector, and the second component is an injector needle of the fuel injector.

In accordance with another preferred embodiment of the invention, the matching portions comprise a guiding hole of the injector body and a corresponding guided portion of the injector needle, and/or a passage hole of the injector body and a corresponding stem portion of the injector needle, and/or a needle seat of the injector body and a corresponding seating.

In accordance with another preferred embodiment of the invention, the matching portions comprise a guiding hole of the injector body and a corresponding guided portion of the injector needle, the dimension of the matching portion of the first component to be measured is the inner diameter of the guiding hole of the injector body, and the desired dimension and the real dimension of the matching portion of the second component are the desired outer diameter and the real outer diameter of the guided portion of the injector needle respectively.

In accordance with another preferred embodiment of the invention, the second component is rotatably carried.

In accordance with another preferred embodiment of the invention, the laser is an ultrashort pulse laser.

In accordance with another preferred embodiment of the invention, the ultrashort pulse laser is a femtosecond laser.

In accordance with another preferred embodiment of the invention, the power of the laser beam is modulated for a local ablation to the outer surface of the matching portion of the second component.

According to the invention, injector needles are match honed by laser based on the measurement of injector bodies. Thus, the grading step of the prior art is eliminated and the component inventory is significantly lowered.

BRIEF DESCRIPTION TO THE DRAWINGS

The present invention will be described in details with reference to the drawings, in which.

DETAILED DESCRIPTION

Figure 1:
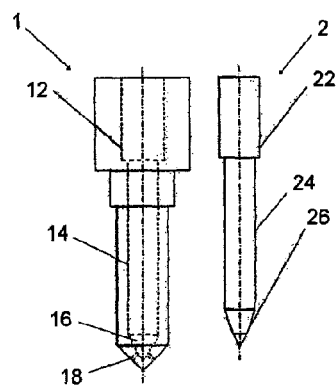
FIG. 1 is a schematic view showing an injector body and an injector needle of a fuel injector in accordance with an embodiment of the present invention.

As shown in FIG. 1, a fuel injector comprises an injector body 1 and an injector needle 2.

The injector body 1 is formed in sequence from its base end to its tip end with a guiding hole 12, a passage hole 14, a needle seat 16 and injections holes 18. The injector needle 2 comprises a guided portion 22 to be slidably inserted into and fitted with the guiding hole 12, a stem portion 24 located in the passage hole 14 and forming a gap between the stem portion 24 and the passage hole 14, and a seating portion 26 adapted to seat onto the needle seat 16 or move away from it.

There are two geometric interfaces between the injector body 1 and the injector needle 2. The first one is formed between the guiding hole 12 and the guided portion 22, and the second one is formed between the needle seat 16 and the seating portion 26.

The guided portion 22 is slidable in the guiding hole 12 under the guidance of the latter. The seating portion 26 and the needle seat 16 cooperate to form a valve for opening and closing the injector.

The dimensional precision of the guiding hole 12 and that of the guided portion 22 should be very high for correct guiding. For example, the inner diameter of the guiding hole 12 may have a manufacturing tolerance of about ±0.5 urn, and the outer diameter of guided portion 22 may have a manufacturing tolerance of about ±0.25 urn.

In traditional manufacturing processes, the injector needles are produced first by lathing a bar-like material, and then by two grinding steps, i.e., a rough grinding step and a fine grinding step. In order to meet the requirement of fit tolerance, a grading step should be performed for the injector needles.

According to the present invention, the two grinding steps are substituted by a laser honing step for forming at least a guided surface having a predetermined manufacturing tolerance for the guided portion 22 of the injector needle. The stem portion 24 and the seating portion 26 may also be honed in the same laser honing step.

Figure 2:
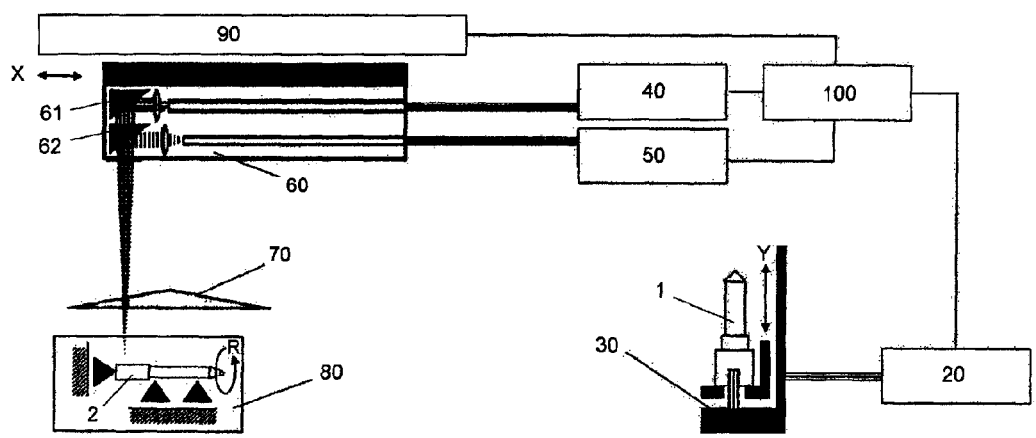
FIG. 2 is a schematic view showing a laser match honing system and its operation principle in accordance with an embodiment of the present invention.

FIG. 2 shows a laser match honing system for honing an injector body according to a preferred embodiment of the invention. The laser match honing system comprises a system controller 100 for reading data and controlling the operation of the laser match honing system.

A measuring gauge 20 measures the dimensions of various mner portions of an injector body 1, in particular the inner diameter of the guiding hole 12. The measuring gauge 20 may be of any type known in the field, for example, a pneumatic gauge as used in the prior art. The measuring gauge 20 has a measuring table 30 on which an injector body 1 is supported to be moved reciprocately in a "Y" direction, which may be a vertical direction. When the injector body 1 is moving, the dimensions of the injector body 1 are measured and the measured data are transmitted to the system controller 100 by the measuring gauge 20. The measured data comprise the dimensions of the guiding hole 12, the passage hole 14 and the needle seat 16 of the injector body 1, in particular the inner diameter of the guiding hole. Based on those data, the system controller 100 determines the corresponding desired dimensions of the guided portion 22, the stem portion 24 and the seating portion 26 of the injector needle 2, in particular the outer diameter of the guided portion 22, and the processing parameters to be applied onto the injector needle 2.

An operator interface 90, for example a glass scale, may be connected to the system controller 100 for controlling the operation of the laser match honing system by means of the system controller.

A laser beam source 40 and an optical measuring instrument 50 are coupled to the system controller 100 on one hand, and are coupled to a processing optic unit 60 on the other hand. The laser beam source 40 receives instructions from the system controller 100 and emits a laser beam towards the processing optic unit 60.

The processing optic unit 60 comprises a set of processing optics 61 coupled to the laser beam source 40 and a set of measuring optics 62 coupled to the optical measuring instrument 50.

The laser beam emitted from the laser beam source 40 is transmitted into the processing optic unit 60 and is reformed and reflected by the processing optics 61 so as to be output in a converged manner from the processing optic unit 60. The output converging laser beam is focused onto a focusing point on an outer surface of an injector needle 2 rotatably supported in a supporting device 80 for honing the outer surface of the injector needle 2, in particular that of the guided portion 22.

The set of measuring optics 62 receives a measuring light from the optical measuring instrument 50 and directs the measuring light onto a point on the outer surface of the injector needle 2, in particular on that of the guided portion 22, which point coinciding with the focusing point of the laser beam. The measuring light is reflected back to the optical measuring instrument 50 via a reverse path. Thus, the distance between the processing optic unit 60 and the outer surface of the injector needle 2 can be measured. The real dimension or outer diameter of the injector needle 2 at this point can be calculated by the system controller 100. If the real dimension or outer diameter (excluding the tolerance) is larger than a desired dimension or outer diameter, then an ultrashort pulse laser is sent to this point within a time period as short as possible to form an ablation point by removing a piece of material of the injector needle.

A lateral suction device 70 is provided between the processing optic unit 60 and the supporting device 80 near the honing location on the outer surface of the injector needle 2 for drawing away the material removed from the injector needle 2 to protect the optics of the processing optic unit 60 from the removed material.

The injector needle 2 is automatically or manually loaded into the supporting device 80. The longitudinal central axis of the injector needle 2 lies preferably in a horizontal direction. The injector needle 2 is rotated while being honed by the laser beam. The honing location on the outer surface of the injector needle 2 is protected from being reachable from outside by a casing. The casing may for example shield the honing location by an angle of about 120° around the central axis of the injector needle. The supporting device 80 may hold the injector needle 2 by means of a clamp, such as a chuck, and drive the injector needle 2 to rotate around its central axis in a direction "R" shown in FIG. 2 by means of the chuck or one or more friction rollers. A ceramic rolling bearing may also be used for supporting the injector needle.

The processing optic unit 60 is movable in a direction "X" parallel to the central axis of the injector needle 2 which is in the supporting device 80. The direction "X" may be a horizontal direction, for example.

A linear direct drive free of clearance may be used for driving the processing optic unit 60 to move.

As the ultrashort pulse laser for removing material from the injector needle, a femtosecond laser may be used. In this condition, no heat affected zone is found in the material near the ablation area.

During the rotation of the injector needle, slippage may occur between the injector needle and the supporting device. However, honing irregularity will be compensated by the system in accordance with the present invention.

White light interferometry may be used in the optical measuring instrument 50. Advantageously, the wavelength of the honing laser and the wavelength of the measuring light of the optical measuring instrument 50 should be adapted to be compatible with each other or equal to each other, so that the laser beam and the measuring light are coaxially located between the processing optic unit 60 and the injector needle 2.

The rotation speed of the injector needle 2 and the pulse frequency of the laser beam may be synchronized, but it is not necessarily so. Preferably, the supporting device 80 comprises a high constant-velocity drive for the injector needle. In any case, the ablation points should be dense enough so as to form a fine grating. The quality of the grating of the ablation points mainly depends on the rotation speed, the geometry of the ablation points (craters) and the longitudinal focus feeding resolution of the laser beam.

According to the invention, an injector needle is finely processed by laser honing, instead of grinding. As a result, a higher surface precision may be obtained. Further, the same clamp is used during honing, which helps to improve the concentricity of the portions of the injector needle, as compared to the prior art where different clamps are used in different grinding steps.

In the condition of a coated injector needle having a coating which is thick enough to be processed or which has enough processing capability, the laser ablation may be performed once after coating. Alternatively, the laser ablation may be performed twice, one before coating and the other after coating. If necessary, the laser ablation may be performed several times to the injector needle to meet the allocation requirement to the injector body.

Laser ablation may be carried out in several operating modes so that laser ablation may be used primarily as a cutting process and then used as precise machining For different operating modes, it is necessary to adjust the mean pulse power, the peak pulse power, the spacing of the grating of the ablation points, etc.

As the processing optic unit, a uni-axial scanner can be used.

Alternatively, a bi-axial scanner is used so that, when a first injector needle is loaded, a second injector needle can be honed by laser.

Alternatively, a tri-axial scanner is used, in which a third axis is used for substituting an f-8 lens for compensating the angle of laser radiation.

The output power of the laser may be modulated for a local ablation suitable for a certain outer diameter of the injector needle. In this way, the necessary number of the pulses can be reduced and thus the manufacture cycle time can be shortened. Ideally, only a complete turn of the injector needle is necessary.

Further, laser ablation may be used for forming a desired feature or structure on the outer surface of the injector needle, for example, a feature for influencing a hydraulic flow rate, an opening for pressure progression, a feature for achieving a radial movement, etc.

Figure 3:
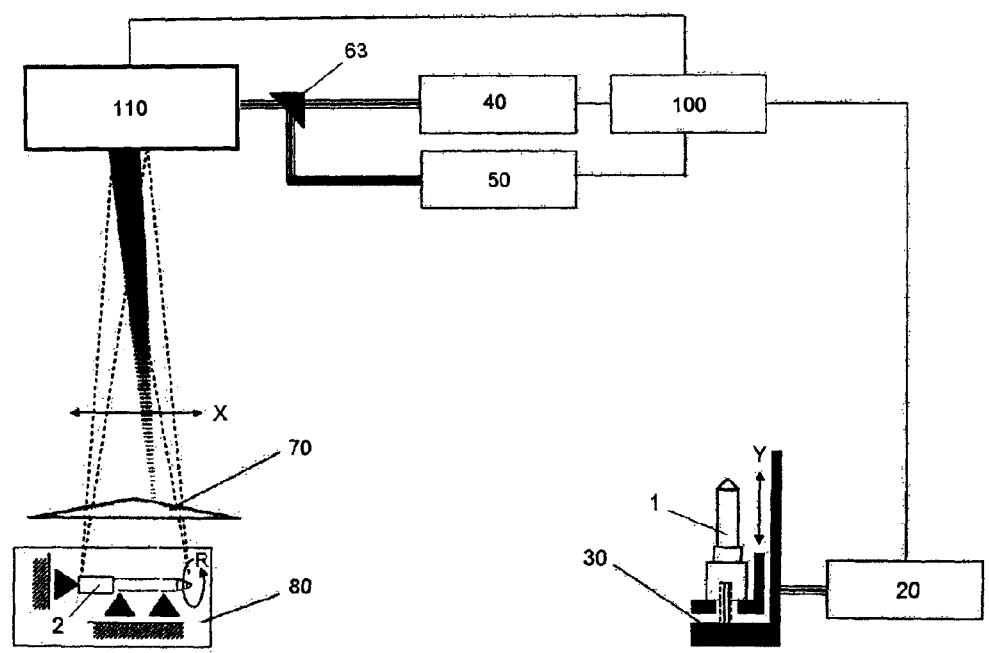
FIG. 3 is a schematic view showing a laser match honing system and its operation principle in accordance with another embodiment of the present invention, wherein a scanner is used as the processing optic unit.

FIG. 3 shows a laser match honing system for honing an injector body according to another preferred embodiment of the invention. The laser match honing system shown in FIG. 3 is basically similar to that of FIG. 2, and thus only the differences between them are described below.

In the laser match honing system shown in FIG. 3, the processing optic unit 60 is replaced by a scanner 110, and a joint optics 63 is arranged in the laser path between the laser beam source 40 and the scanner 110. The optical measuring instrument 50 is coupled between the joint optics 63 and the system controller 100. In this way, the path of the measuring light is combined into the laser path before they reach the common scanner 110. The scanner 110 is pivotable, so that the path of the laser and the measuring light between the scanner 110 and the supporting device 80 is movable in the direction "X".

Other aspects of the laser match honing system shown in FIG. 3 are similar to that shown in FIG. 2.

The laser match honing method in accordance with a preferred embodiment of the invention for manufacturing an injector needle of a fuel injector will be described below.

First, an injector body to be fitted with an injector needle IS manufactured.

Then, the injector needle is lathed out from a bar material. The lathing process should remove as more material as possible. The injector needle, after lathing, is loaded into the supporting device 80 and held therein for rotation.

Then, in a laser match honing system shown in either FIG. 2 or FIG. 3, the injector body is put onto the measuring table 30, and the dimensions of various matching portions of the injector body, in particular the inner diameter of the guiding hole 12, are measured by the measuring gauge 20. The measuring gauge 20 sends the measured data to the system controller 100 which determines the desired dimensions of the corresponding matching portions of the injector needle, in particular the outer diameter of the guided portion 22 of the injector needle.

Then, the system controller 100 operates the optical measuring instrument 50 to measure a real dimension of a corresponding matching portion of the injector needle, in particular the outer diameter of the guided portion. Then the system controller 100 compares the real dimension with the desired dimension. If the real dimension is larger than the desired dimension, then the system controller 100 commands the processing optic unit 60 or the scanner 110 to hone the matching portion of the injector needle by laser.

The optical measuring and laser honing are repeated until the desired dimension at a matching portion of the injector needle, in particular the desired outer diameter of the guided portion, is obtained.

By using the laser match honing system and the method of the invention, the grading step and the rough grinding step in the prior art are eliminated. In addition, the injector needles manufactured in this way can be allocated to the injector bodies having a particular manufacturing tolerance. Thus, the inventory of redundant injector needles is avoided. In combination, the invention results in a significant cost saving.

Further, various typical problems created by grinding machines, such as transferring between the grinding machines which is time wasteful, consuming of grinding wheel and operating medium, releasing oil fog, creating pollution by cooling water, and forming new hardening or tempered zones, can be avoided by the invention.

Furthermore, according to the invention, the distance between the processing optic unit 60 and the injector needle is automatically measured during the operation of the system without any manual correction or adjustment. In this way, the whole system can be improved by eliminating the adjustment time, shortening the time for replacing worn parts and increasing the manufacture efficiency.

It can be understood that the present invention is not limited to the processing of injector needles as described above. Rather, the invention may be applied to process any component of a pair of mechanically matching components.

The present invention is not to be limited in scope by the specific embodiments described herein. Indeed, various modifications of the invention in addition to those described herein will become apparent to those skilled in the art from the foregoing description and accompanying drawings. Such modifications are intended to fall within the scope of the claims.

What is claimed is:

1. A laser match honing system for processing one of a pair of mechanically matching components, the pair comprising a first component which has a finished matching portion and a second component which has a corresponding matching portion to be processed, the system comprising:
   a system controller for controlling the operation of the system,
   a measuring gauge coupled to the system controller and adapted to measure a dimension of the matching portion of the first component and send the measurement to the system controller,
   a supporting device adapted to carry the second component,
   a laser beam source coupled between a processing optic unit and the system controller and adapted to emit a laser beam to the processing optic unit when receiving a command from the system controller,
   an optical measuring instrument coupled between the processing optic unit and the system controller and adapted to emit a measuring light to the processing optic unit for measuring a current distance between the processing optic unit and the matching portion of the second component, and the processing optic unit being adapted to direct the laser beam and the measuring light onto the matching portion of the second component, wherein the system controller calculates a desired dimension and a real dimension of the matching portion of the second component based on the measurement from the measuring gauge and the measurement from the optical measuring instrument respectively, and then the system controller, when the real dimension is not equal to the desired dimension, operates the laser beam source to transmit the laser beam for honing the matching portion of the second component by the laser beam.

2. The laser match honing system of claim 1, wherein the first component is an injector body of a fuel injector, and the second component is an injector needle of the fuel injector.

3. The laser match honing system of claim 2, wherein the matching portions comprise at least one of (a) a guiding hole of the injector body and a corresponding guided portion of the injector needle, (b) a passage hole of the injector body and a corresponding stem portion of the injector needle, and (c) a needle seat of the injector body and a corresponding seating portion of the injector needle.

4. The laser match honing system of claim 2, wherein the matching portions comprise a guiding hole of the injector body and a corresponding guided portion of the injector needle, the dimension of the matching portion of the first component to be measured by the measuring gauge is an inner diameter of the guiding hole of the injector body, and the desired dimension and the real dimension of the matching portion of the second component are a desired outer diameter and a real outer diameter of the guided portion of the injector needle respectively.

5. The laser match honing system of claim 1, wherein the second component is rotatably carried by the supporting device.

6. The laser match honing system of claim 1, wherein the processing optic unit is movable so that the laser beam and the measuring light move in a direction parallel to a central axis of the second component.

7. The laser match honing system of claim 6, wherein the processing optic unit is moved by a linear direct drive free of clearance.

8. The laser match honing system of claim 1, wherein the processing optic unit is a scanner.

9. The laser match honing system of claim 1, wherein the laser is an ultrashort pulse laser.

10. The laser match honing system of claim 1, wherein the laser beam and the measuring light are coaxial between the processing optic unit and the matching portion of the second component.

11. The laser match honing system of one of claim 1, further comprising a lateral suction device near the matching portion of the second component.

12. A laser match honing method for processing one of a pair of mechanically matching components, the pair comprising a first component which has a finished matching portion and a second component which has a corresponding matching portion to be processed, the method comprising:

measuring a dimension of the matching portion of the first component, measuring a current distance between a processing optic unit and the matching portion of the second component, calculating a desired dimension and a real dimension of the matching portion of the second component based on the measured dimension and the measured distance respectively, and honing the matching portion of the second component by laser beam when the real dimension is not equal to the desired dimension.

13. The laser match honing method of claim 12, wherein the first component is an injector body of a fuel injector, and the second component is an injector needle of the fuel injector.

14. The laser match honing method of claim 13, wherein the matching portions comprise at least one of (a) a guiding hole of the injector body and a corresponding guided portion of the injector needle, (b) a passage hole of the injector body and a corresponding stem portion of the injector needle, and (c) a needle seat of the injector body and a corresponding seating portion of the injector needle.

15. The laser match honing method of claim 13, wherein the matching portions comprise a guiding hole of the injector body and a corresponding guided portion of the injector needle, the dimension of the matching portion of the first component to be measured is an inner diameter of the guiding hole of the injector body, and the desired dimension and the real dimension of the matching portion of the second component are a desired outer diameter and a real outer diameter of the guided portion of the injector needle respectively.

16. The laser match honing method of claim 12, wherein the second component is rotatably carried.

17. The laser match honing method of claim 12, wherein the laser is a femtosecond laser.

18. The laser match honing method of claim 12, wherein power of the laser beam is modulated for a local ablation to an outer surface of the matching portion of the second component.

19. The laser match honing system of claim 8, wherein the scanner is one of a uni-axial scanner, a bi-axial scanner, and a tri-axial scanner.

20. The laser match honing system of claim 9, wherein the laser is a femtosecond laser.

* * * * *